United States Patent [19]

Ingram et al.

[11] Patent Number: 5,790,961
[45] Date of Patent: Aug. 4, 1998

[54] POWER CONTROL CIRCUIT FOR A BATTERY OPERATED DEVICE

[75] Inventors: Norbert D. Ingram, Cary; Seung K. Kim, Chapel Hill, both of N.C.

[73] Assignee: Ericsson Inc., Research Triangle Park, N.C.

[21] Appl. No.: 783,409

[22] Filed: Jan. 14, 1997

Related U.S. Application Data

[63] Continuation of Ser. No. 439,242, May 11, 1995, abandoned.

[51] Int. Cl.$^6$ .............................. H04B 1/38; H04M 1/00
[52] U.S. Cl. ........................... 455/574; 455/575; 455/343
[58] Field of Search .......................... 455/89, 127, 38.2, 455/38.3, 343, 572–575; 379/59; 323/282–283; 320/13, 40; 307/10.7; 340/636; 361/88, 92

[56] References Cited

U.S. PATENT DOCUMENTS

| | | |
|---|---|---|
| 4,342,953 | 8/1982 | Collins . |
| 4,536,695 | 8/1985 | Lin . |
| 4,788,711 | 11/1988 | Nasco, Jr. ............... 455/343 |
| 4,882,762 | 11/1989 | Waldhauer ............... 455/72 |
| 4,962,523 | 10/1990 | Tanaka ................... 455/127 |
| 5,049,805 | 9/1991 | Celenza et al. . |
| 5,095,308 | 3/1992 | Hewitt ................... 455/343 |
| 5,155,428 | 10/1992 | Kang . |
| 5,179,337 | 1/1993 | Staarman et al. . |
| 5,265,271 | 11/1993 | Marko et al. . |
| 5,332,958 | 7/1994 | Sloan . |
| 5,343,137 | 8/1994 | Kitaoka et al. . |
| 5,375,247 | 12/1994 | Hueser . |

FOREIGN PATENT DOCUMENTS

| | | |
|---|---|---|
| 0 415 376 A2 | 3/1991 | European Pat. Off. . |
| 2-154539 | 6/1990 | Japan .................. 455/38.3 |
| 2 215 100 | 9/1989 | United Kingdom . |

*Primary Examiner*—Nguyen Vo
*Attorney, Agent, or Firm*—Burns, Doane, Swecker & Mathis, L.L.P.

[57] ABSTRACT

A circuit is disclosed for switching power to a battery operated device, particularly a portable radio transceiver. The power control circuit uses an on/off switch that remains in a fixed "on" or "off" position instead of using a momentary push button switch. The circuit allows powering down the radio to prevent deep discharging of the battery even though the switch remains in the "on" position. Also, the circuit allows the radio to continue to be powered up under microprocessor control after the switch is placed in the "off" position.

12 Claims, 1 Drawing Sheet

POWER CONTROL CIRCUIT FOR A BATTERY OPERATED DEVICE

This application is a continuation of application Ser. No. 08/439,242, filed May 11, 1995, now abandoned.

BACKGROUND OF THE INVENTION

1) Field of the Invention

The present invention is directed to a circuit for switching power to a battery operated device such as a portable radio transceiver and, more particularly, to a power control circuit which allows powering down the device to prevent deep discharging of the battery even though an ON/OFF switch remains in a physical "on" position and allows the device to continue to be powered up under microprocessor control after the switch is placed in the "off" position.

2) Discussion of Related Art

Users of electronic devices, such as land mobile radio customers, prefer controls and switches which readily indicate the switch state (on/off) by their position. Presently, cellular telephone products for example use a momentary position push button switch. Momentary position push button switches tend to be undesirable for a number of reasons. For instance, push buttons can accidentally be bumped into changing their state. This can be life threatening when in an emergency situation and the device is inadvertently turned off. Further, monitoring by a user of the state of the battery powered device is not always convenient. For instance, monitoring might require the inconvenience of observing display indicators on a radio attached to a person's belt. Consequently, customers prefer switches which remain in a fixed position, such as slide or rotary types, so that they can indicate their position by touch.

Portable radio phones, for instance, may require that additional procedures be carried out, such as a log-out procedure, after the user has turned off the unit. Simple circuit designs exist using momentary push button switches which can power down the portable radio after logging out from the fixed land radio system. This is because the momentary pulse generated when the push button is depressed is just another control signal, which triggers a termination procedure, and not an electrical disconnection of a power source.

Other problems associated with battery operated devices are battery power monitoring and battery life. Many battery operated devices use rechargeable cells such as Nickel Metal Hydride (Ni—MH) and Nickel Cadmium (NiCd) batteries, which are capable of over 500 charge/discharge cycles during their lifetime. This cycle life can be significantly reduced if the cells are repeatedly deep discharged by accidently leaving the battery operated device on. Poor battery pack life has been a major warranty expense for past products, particularly portable phones. This problem can be prevented by automatically powering down after the battery voltage falls below a threshold. However, if a fixed position switch is used, this would require the power control circuit to power down the battery controlled device even though the fixed position on/off switch is still in the "on" position.

SUMMARY OF THE INVENTION

These and other problems are solved by the present invention, which involves a power control circuit including a power supply such as a voltage regulator having a disable function which controls whether power is supplied to a load. The invention also includes a mechanical switch having at least an ON position and an OFF position, and a first electronic switch such as a transistor, separate and distinct from the mechanical switch, for controlling the disable function of the power supply. A microprocessor controls the state of the first electronic switch and monitors the state of the mechanical switch, wherein when the mechanical switch is detected to change from its ON position to its OFF position, the microprocessor selectively changes the state of the first electronic switch to disable the power supply.

The power control circuit may further include power level monitoring circuit elements for monitoring a level of voltage output from a battery connected to the power supply and a second electronic switch such as a latch for controlling the disable function of the power supply when the voltage level of the battery is below a threshold voltage.

Once a battery operated device is powered down due to low battery level, the use of the fixed position switch (which is still in the "on" position) requires some form of reset operation. The power control circuit disclosed herein continues to keep the battery powered device powered down until reset by changing the on/off switch "off" and back "on", after a proper battery voltage has been restored.

Another feature of the power control circuit disclosed herein permits performing tasks after the on/off switch is moved to the "off" position. For instance, when the battery powered device is a portable radio transceiver such as a personal communications device or mobile telephone in a cellular telephone system, it is necessary for the transceiver to transmit a log-out message to the fixed radio system (e.g., via a base station) and perhaps perform other functions after the user has switched the fixed position power control switch to the "off" position. These terminating procedures require that the power be under alternative control, e.g., under microprocessor control, until successfully transmitting the log-out message and perhaps performing other tasks before shutting down. Therefore, the power control circuit disclosed herein continues to power the load, even though the on/off switch is in the "off" position, until the microprocessor determines otherwise.

The present power control circuit with a fixed position switch avoids problems associated with methods using unreliable RC time constants for generating pulses from the switch, etc.

Also, the present power control circuit's current use is negligible. When power is off, total radio current drain is much less than the equivalent self discharge rate of the battery. When power is on, the power control circuit requires only minimal current compared to the normal radio current.

Further, the present power control circuit answers customers' demand for a mechanical indication of the ON/OFF status of the battery powered device.

The power control circuit disclosed herein will meet customers' demands for a mechanical switch while increasing battery pack life, reducing warranty returns, and providing a capability for a log-out or other terminal operations.

BRIEF DESCRIPTION OF THE DRAWING

The invention will now be described with reference to the drawing figure in which.

DETAILED DESCRIPTION OF THE PREFERRED EMBODIMENTS

Figure 1:
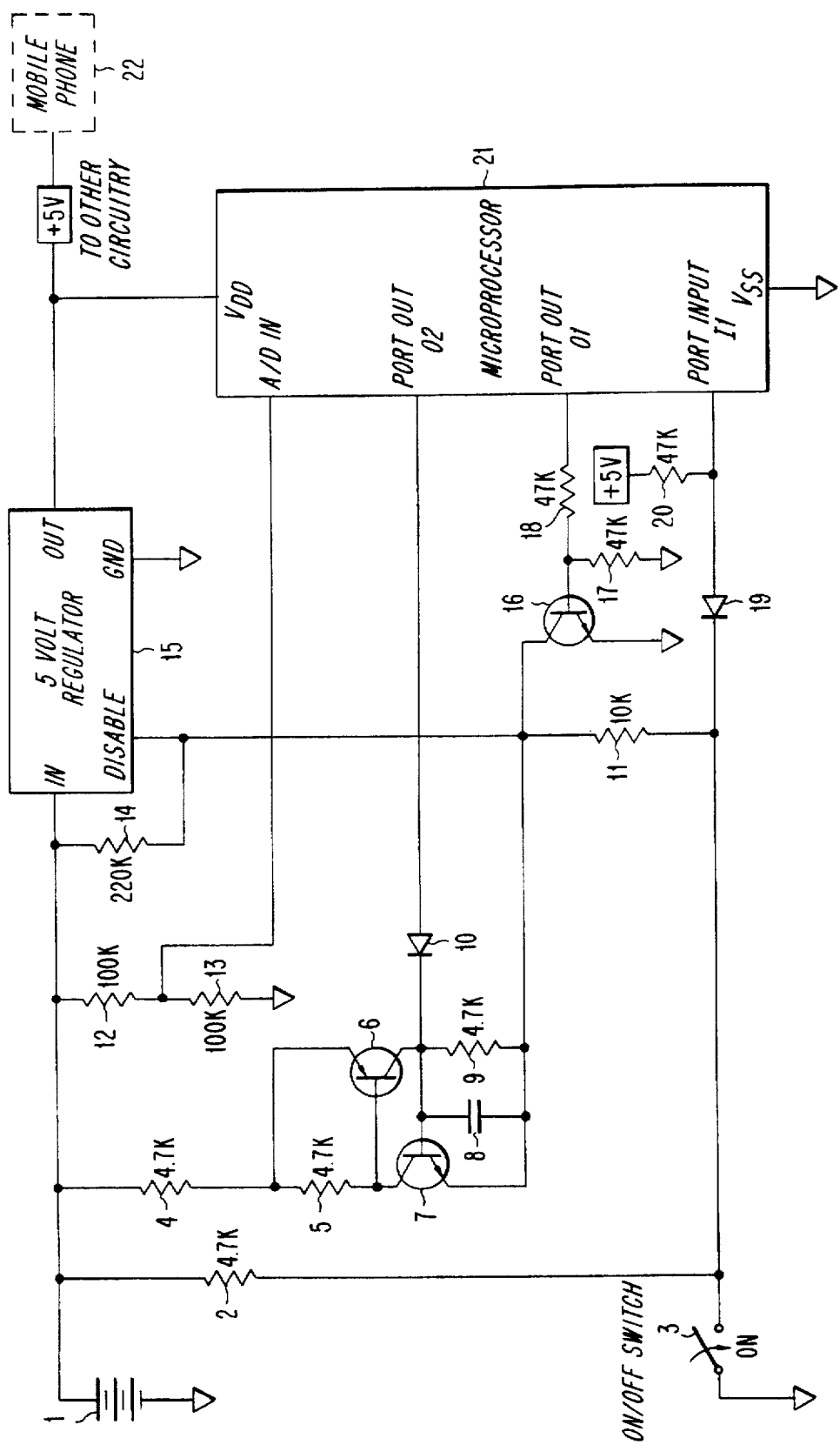
FIG. 1 is a schematic diagram of an exemplary embodiment of the present invention.

As depicted in FIG. 1, a battery 1 supplies power to an input of a voltage regulator 15, which supplies a consistent 5 volts to the power control circuit and to the rest of the battery powered device, such as a mobile telephone 22. The battery 1 can be one or more batteries of any suitable type including rechargeable batteries such as a Ni—MH or NiCd batteries or an alkaline batteries. Similarly, the voltage regulator 15 can be of any type suitable for supplying a predetermined voltage level utilized by the rest of the circuitry load (e.g., the mobile telephone 22). The voltage regulator 15 can have a disable function, thereby being capable of acting as a controllable power source in one package for lower cost. Alternatively, any external electronic switch, such as a transistor or a power MOSFET, could switch the power off to the radio circuitry. Also, lower cost and current consumption can be achieved by implementing the entire circuit using CMOS technology in an Application Specific Integrated Circuit (ASIC).

The voltage regulator 15 has an internal electronic switch controlled by the state of its disable input pin. A first resistor 14 is connected between the positive terminal of the battery 1 and at the disable input pin of the voltage regulator 15. The first resistor 14 normally keeps the disable input at a sufficiently high voltage to turn off the regulator's internal switch and thus turn off the voltage regulator 15 and load's power.

To turn on the internal electronic switch of the voltage regulator 15 (and thus supply power to the load 22), the disable pin voltage must be brought down near ground voltage. This is done by operation of a fixed position switch 3 which grounds the disable pin through a second resistor 11. The fixed position switch 3 may be one of a wide variety of mechanical switches, such as slide switches, rotary switch, ratchet operated push-button switches, etc. so long as the switch indicates by the relative position of a switch member the state (on/off) of the switch. The switch is to have at least two discrete physical states.

The first resistor 14 has a large enough resistance value (e.g., 220 kΩ) relative to the second resistor 11 (e.g., 10 kΩ) so that when the fixed position switch 3 is moved to an "on" position, the disable pin is sufficiently grounded through the second resistor 11. The voltage regulator 15 can then supply power to a microprocessor 21.

POWER-ON OPERATIONS

Upon being powered up, the microprocessor port lines are in a tri-state condition. Software in the microprocessor 21 first sets port output O1 to a logic high level which causes a first transistor 16, by operation of its base voltage supplied by a voltage divider formed by third and fourth resistors 17 and 18 (each having a value of 47 kΩ in the exemplary embodiment) to ground the disable pin, in addition to the switch 3. Therefore, if switch 3 is now rotated back "off", the microprocessor 21 will continue to have control of the radio power to allow transmitting a log-out message, and/or other terminal procedures.

The status of switch 3 is monitored by the microprocessor 21 by periodically sampling port input I1 with the use of a fifth resistor 20 (having a resistance value of 47 kΩ in the exemplary embodiment) connected between a regulated voltage output port of the voltage regulator 15 and the input port I1 of the microprocessor 21. The input port I1 of the microprocessor 21 is also connected to the switch 3 through a diode 19. The diode 19 prevents the voltage from the battery 1, which is also connected to the switch 3 through a sixth resistance 2 (for reasons explained below) from exceeding the microprocessor's maximum input voltage of 5 volts. A logic high indicates the switch is in the "off" position. When the switch 3 is detected to have been switched off, the microprocessor 21 performed its terminating procedures, such as a log-out procedure when the load is a radio communication device. When the terminating procedures are complete, the microprocessor 21 turns off the first transistor 16, thus causing the disable input pin of the voltage regulator to go high and thereby turn off the voltage regulator 15.

BATTERY LEVEL MONITORING

To prevent deep discharge of the battery 1, the microprocessor 21 periodically monitors the battery voltage level by sampling its internal analog-to-digital convertor (A/D) input level. The battery voltage output level is detected by converting the voltage generated by a voltage divider formed by seventh and eighth resistors 12 and 13 serially connected between the positive terminal of the battery 1 and ground. This voltage divider prevents the monitored voltage exceeding the microprocessor's maximum input voltage of, e.g., 5 volts. If the battery voltage falls below a threshold (which can be varied by a software change in the microprocessor 21 or by making one of the seventh and eighth resistances 12 and 13 variable, for instance), the microprocessor 21 first writes a logic low to port output O1. This removes the ground at the output of the first transistor 16, but the switch 3 still holds the regulator disable pin grounded through the second resistor 11. The microprocessor 21 must then set port output O2 to a high level, which turns on a latch circuit including a second transistor 6 and a third transistor 7.

The latch circuit essentially parallels the first resistor 14 with a much lower value of resistance using ninth and tenth resistors 4 and 5 (each having a resistance value of 4.7 kΩ in the exemplary embodiment), forcing the disable pin higher in voltage, and thus turning off the internal electronic switch in the voltage regulator 15. The latch is used because the microprocessor control signal from port output O2 will disappear when the regulator is switched off since the microprocessor's power is supplied by the regulator. For the same reason, the latch must operate directly from the widely varying battery voltage and remain latched. If not, the regulator 15 would power back up again since the on/off switch 3 is still in the "on" position.

Normally the latch transistors 6 and 7 are off. A capacitor 8 connected between the base and the emitter of the third transistor 7 prevents triggering the latch with noise or radio frequency interference (RFI) from radio transmitters. A logic high voltage sent from the microprocessor 21 through a second diode 10, connected to the base of the third transistor 7 and the emitter of the second transistor 6, turns on the third transistor 7. Current can then flow from the base of the third transistor 7 and from the base of second transistor 6 which turns on also. The second transistor 6 collector supplies current to the third transistor 7, as biased by an eleventh resistor 9 (having a 4.7 kΩ resistance value in the exemplary embodiment), thus latching the two transistors 6 and 7 on. For the latch to remain on, the emitter of the third transistor 7 must remain sufficiently low in voltage. If the ON/OFF switch 3 is turned "off" (opened), the sixth resistor 2 causes the emitter to rise sufficiently high in voltage to turn off the third transistor 7. Removing the battery voltage of course will also unlatch the latch transistors 6 and 7.

It is to be noted that the circuit elements disclosed herein can be of CMOS or FET transistor or vacuum tube technologies and may be part of an ASIC or in the form of discrete elements. Further, the microprocessor 21 may be dedicated to the functions disclosed above, or serve other functions beyond the scope of this disclosure. The latch disclosed above can be in the form of any suitable buffer that serves as an interface by accepting and holding a value from one circuit section until another circuit section is ready to use it.

The invention described herein includes variations thereof. The described embodiment is to be considered in all respects as illustrative and not restrictive, the scope of the invention being indicated by the appended claims, and all changes within the meaning and range of equivalency of the claim recitations are intended to be embraced therein.

We claim:

1. A power control circuit comprising:

a power supply having a disable function controlling whether power is supplied to a load;

a mechanical switch having at least an ON position and an OFF position;

a first electronic switch, separate and distinct from said mechanical switch, for controlling said disable function of said power supply; and a microprocessor for controlling the state of said first electronic switch and monitoring the state of said mechanical switch, wherein when said mechanical switch is detected to change from said ON position to said OFF position, said microprocessor selectively changes the state of said first electronic switch to disable said power supply after said microprocessor completes a terminating procedure.

2. The power control circuit of claim 1, further comprising:

a power level monitor for monitoring a level of voltage output from a battery connected to said power supply; and a second electronic switch for controlling the disable function of said power supply when said voltage level of said battery is below a threshold voltage.

3. The power control circuit of claim 2, wherein said power supply is a voltage regulator connected to a battery.

4. The power control circuit of claim 2, wherein said second electronic switch is a latch circuit.

5. The power control circuit of claim 1, wherein said first electronic switch is a transistor.

6. The power control circuit of claim 1, wherein said power supply is a voltage regulator connected to a battery.

7. A mobile radio terminal comprising:

a radio transceiver;

a power supply having a disable function controlling whether power is supplied to said radio transceiver;

a mechanical switch having at least an ON position and an OFF position;

a first electronic switch, separate and distinct from said mechanical switch, for controlling said disable function of said power supply; and a microprocessor for controlling the state of said first electronic switch and monitoring the state of said mechanical switch, wherein when said mechanical switch is detected to change from said ON position to said OFF position, said microprocessor selectively changes the state of said first electronic switch to disable said power supply after said microprocessor completes a terminating procedure.

8. The mobile radio terminal of claim 7, further comprising:

a power level monitor for monitoring a level of voltage output from a battery connected to said power supply; and a second electronic switch for controlling the disable function of said power supply when said voltage level of said battery is below a threshold voltage.

9. The mobile radio terminal of claim 8, wherein said power supply is a voltage regulator connected to a battery.

10. The mobile radio terminal of claim 8, wherein said second electronic switch is a latch circuit.

11. The mobile radio terminal of claim 7, wherein said first electronic switch is a transistor.

12. The mobile radio terminal of claim 7, wherein said power supply is a voltage regulator connected to a battery.

* * * * *